United States Patent [19]

Biermann

[11] Patent Number: 5,584,193
[45] Date of Patent: Dec. 17, 1996

[54] ABSORPTION-TYPE REFRIGERATION SYSTEMS AND METHODS

[75] Inventor: Wendell J. Biermann, Fayetteville, N.Y.

[73] Assignee: York International Corporation, York, Pa.

[21] Appl. No.: 233,264

[22] Filed: Apr. 26, 1994

[51] Int. Cl.$^6$ ................................................ F25B 15/00
[52] U.S. Cl. .................................................... 62/476
[58] Field of Search .......................... 62/476, 101, 103

[56] References Cited

U.S. PATENT DOCUMENTS

| | | | |
|---|---|---|---|
| 1,929,841 | 10/1933 | Fitch, Jr. ................................. | 62/179 |
| 2,282,503 | 5/1942 | Thomas et al. .......................... | 62/119 |
| 2,548,921 | 4/1951 | Von Platen ............................. | 62/119.5 |
| 2,963,875 | 12/1960 | Mills ....................................... | 62/112 |
| 3,108,049 | 10/1963 | Bowers et al. .......................... | 102/197 |
| 3,138,005 | 6/1964 | Bourne et al. .......................... | 62/85 |
| 3,367,134 | 2/1968 | Bourne .................................... | 62/475 |
| 3,793,171 | 2/1974 | Zabolotny et al. .................... | 204/130 |
| 4,014,183 | 3/1977 | Ishibashi et al. ...................... | 62/476 |
| 4,085,595 | 4/1978 | Saito et al. ............................. | 62/476 |
| 4,085,596 | 4/1978 | Miyamoto et al. .................... | 62/476 |
| 4,094,355 | 6/1978 | Blytas ...................................... | 165/1 |
| 4,270,975 | 6/1981 | Bennett ................................... | 159/27 A |
| 4,315,411 | 2/1982 | Vardi et al. ............................. | 62/112 |
| 4,439,999 | 4/1984 | Mori et al. .............................. | 62/238 |
| 4,464,907 | 8/1984 | Mack et al. ............................. | 62/101 |
| 4,475,361 | 10/1984 | Alefeld .................................... | 62/476 |
| 4,520,634 | 6/1985 | Oouchi et al. .......................... | 62/476 |
| 4,521,313 | 6/1985 | Wolde-Michael ...................... | 210/776 |
| 4,531,374 | 7/1985 | Alefeld .................................... | 62/79 |
| 4,542,628 | 9/1985 | Sarkisian et al. ...................... | 62/335 |
| 4,542,629 | 9/1985 | Biermann ................................ | 62/476 |
| 4,546,620 | 10/1985 | Biermann ................................ | 62/476 |
| 4,551,991 | 11/1985 | Miyoshi et al. ........................ | 62/476 |
| 4,719,767 | 1/1988 | Reid, Jr. et al. ........................ | 62/476 |
| 4,742,687 | 5/1988 | Reid et al. ............................... | 62/112 |
| 4,827,728 | 5/1989 | DeVault et al. ......................... | 62/79 |
| 4,934,149 | 6/1990 | DeVault et al. ......................... | 62/463 |
| 5,084,189 | 1/1992 | Richter .................................... | 210/789 |
| 5,154,061 | 10/1992 | Weisshaar ............................... | 62/11 |
| 5,205,136 | 4/1993 | DeVault et al. ......................... | 62/476 |
| 5,216,891 | 6/1993 | Ryan ........................................ | 62/101 |
| 5,335,515 | 8/1994 | Rockenfeller et al. ................. | 62/476 |

OTHER PUBLICATIONS

Jane S. Doolittle & Alexander H. Zerban, Engineering Thermodynamics 209–235 (2d ed. 1955).

Gershon Grossman, Modular and Flexible Simulation of Advanced Absorption Systems, in AES–vol. 31, International Absorption Heat Pump Conference ASME 345–351 (1993).

Walter L. Badger & Julius T. Banchero, Introduction to Chemical Engineering 600–601 (1955).

*Primary Examiner*—William Doerrler
*Attorney, Agent, or Firm*—Finnegan, Henderson, Farabow, Garrett & Dunner

[57] ABSTRACT

Absorption-type refrigeration methods and systems are utilized to minimize decomposition of a heat-transfer additive by removing, in generators operating below the additive's thermal decomposition temperature, the additive from the fluid before it reaches portions of the cycle operating above its thermal decomposition temperature. Inverse series and inverse series-parallel connected triple effect methods and systems operate at lower temperatures that minimize decomposition and yield improved performance by reducing the pumping ratio and by decreasing the effectiveness of certain heat exchangers below standard practice.

25 Claims, 4 Drawing Sheets

ABSORPTION-TYPE REFRIGERATION SYSTEMS AND METHODS

BACKGROUND OF THE INVENTION

1. Field of the Invention

The present invention relates to devices employing an absorption cycle, such as absorption-type refrigeration systems. The present invention particularly relates to absorption-type refrigeration systems using a refrigerant, an absorbent, and a heat-transfer additive.

2. Description of Related Art

Absorption-type refrigeration systems typically include an absorber, one or more pumps, one or more generators, a condenser, an evaporator, and necessary piping and controls. The systems use a fluid including absorbent and refrigerant. The fluid is labelled either strong or weak, depending on whether the concentration of absorbent is relatively high or low, respectively. Typically, a weak fluid contains approximately 56–60 weight percent lithium bromide and a strong fluid contains approximately 59–65 weight percent lithium bromide, the exact values depending upon operating temperatures and the design of the cycle.

Operation of absorption-type refrigeration systems can be briefly explained in reference to an absorption cycle using a single generator. A weak fluid exits or is pumped from the absorber. The weak fluid is subsequently applied to a generator, which evaporates refrigerant from the weak fluid. Since evaporating the refrigerant from the weak fluid increases the concentration of absorbent in the fluid, the fluid is now called a strong fluid.

The evaporated refrigerant condenses in the condenser and passes to the evaporator. In the evaporator, the refrigerant absorbs ambient heat, which provides the desired refrigeration effect. The absorbed heat causes the refrigerant to vaporize.

The vaporized refrigerant passes to the absorber, where it is exposed to strong fluid returning from the generator. The strong fluid absorbs the refrigerant, thereby causing the strong fluid to become weak again.

Performance of an absorption-type refrigeration system can be improved by adding certain additives to the system's fluid. For example, addition of 2-ethyl 1-hexanol (octyl alcohol) to an aqueous lithium bromide fluid improves the performance of absorption-type refrigeration systems using such a fluid. More specifically, the additive improves the rate of heat transfer in the absorber and the condenser. Thus, such additives are referred to as heat-transfer additives.

However, in some absorption-type refrigeration systems, especially those employing more than one generator, the operating temperature of a generator may be above the thermal decomposition temperature of the heat-transfer additive. Decomposition of heat-transfer additives adversely affects the performance of absorption-type refrigeration systems, making it undesirable.

Attempts have been made to minimize the decomposition of heat-transfer additives by reducing or eliminating the flow of heat-transfer additives to the generator. For example, U.S. U.S. Pat. No. 4,315,411 describes a separator for separating a part of the heat-transfer additive from the fluid. The separator is disclosed as being at a point where the weak fluid exits the absorber. The disclosed separator operates on gravity separation. It includes a vessel large enough for slowing down the flow velocity of the fluid. The vessel includes an inlet at its lower part and an outlet at its upper part. A small part of the fluid, substantially enriched in heat-transfer additive, flows out of the outlet at its upper part while the bulk of the fluid, weak in heat-transfer additive, flows out of the outlet at its lower part.

A principal disadvantage of this approach is its reliance upon gravity separation through settling, which is believed to be impractical. In particular, such a system is excessively slow. Thus, there is a need for a system that minimizes decomposition of heat-transfer additives without requiring prolonged storage time for the solution.

Performance of some absorption-type refrigeration systems can be improved by adjusting the pumping ratio. The weak solution mass flow to the generator(s) divided by the refrigerant mass flow to the evaporator yields the pumping ratio. Though decreasing the pumping ratio increases the thermal coefficient of performance (heat supplied to the high-temperature generator divided by the cooling produced by the evaporator) in single and double effect refrigeration systems, it also increases the temperature of the generator(s).

Pumping ratio adjustment is considered an undesirable means of improving performance in triple effect systems because of the anticipated increase in generator temperature. The high-temperature generators in triple effect systems typically operate at temperatures that decompose heat-transfer additives. Decreasing the pumping ratio drives the generator temperature even higher. FIG. 4 shows the effect of decreasing the pumping ratio on a 400 tons, parallel connected, triple effect system, such as the system disclosed in U.S. Pat. No. 5,205,136. The temperature of the strong fluid leaving the high-temperature generator increases rapidly as the pumping ratio is decreased. It is believed that the temperature increases because reducing the pumping ratio increases the concentration of strong fluid, which then increases the boiling point of the strong fluid.

Not only does decreasing the pumping ratio adversely affect the heat-transfer additive in parallel connected, triple effect systems, it also does not provide the desired gain in coefficient of performance. The higher temperature strong fluid leaving the generator puts more load on the heat exchangers. Since the heat exchangers recover only approximately 70% of the heat in the strong fluid, the remaining 30% is wasted when it is rejected in the absorber. As the heat of the strong fluid increases, the amount of wasted heat increases.

The increased loss in the heat exchangers negates the coefficient of performance gains realized by reducing the pumping ratio. As shown in FIG. 3, the coefficient of performance of the parallel connected system remains almost constant as the pumping ratio decreases. Thus, adjusting the pumping ratio does not appear to be a viable means of improving the performance of triple effect systems.

SUMMARY OF THE INVENTION

The present invention solves the problem of heat-transfer additive decomposition discussed above, and is capable of operating quickly and performing at rated capacity. In addition, the present invention provides triple effect absorption-type refrigeration methods and systems having thermal coefficients of performance higher than other triple effect methods and systems.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

An absorption-type refrigeration system in accordance with the present invention comprises an absorber in which a fluid including absorbent absorbs refrigerant vapor, and heat-transfer additive vapor condenses on the surface of the fluid, to form a fluid including absorbent, refrigerant, and heat-transfer additive. Such an absorption-type refrigeration system comprises two or more generators, including a low-temperature generator that operates at a temperature below the thermal decomposition temperature of the heat-transfer additive and a high-temperature generator that can operate at a temperature above the thermal decomposition temperature of the heat-transfer additive.

The system of the present invention minimizes thermal decomposition of heat-transfer additives by removing heat-transfer additives from the fluid that is sent to the high-temperature generator. The refrigerant and heat-transfer additive are vaporized in the low-temperature generator, thus forming a low-temperature vapor including refrigerant and heat-transfer additive and a low-temperature liquid including refrigerant and absorbent but substantially lacking heat-transfer additive. Only the liquid is provided to the high-temperature generator. Thus, only a small amount, if any, of the heat-transfer additive is subject to the temperature of the high-temperature generator.

In addition, the invention includes a method of reducing thermal decomposition of a heat-transfer additive in an absorption-type refrigeration system by heating a weak fluid including refrigerant, absorbent and heat-transfer additive in a low-temperature generator to a temperature sufficient to vaporize the refrigerant but below the thermal decomposition temperature of the heat-transfer additive to form a low-temperature vapor including refrigerant and heat-transfer additive, and a low-temperature liquid including refrigerant and absorbent but substantially lacking heat transfer additive. The low-temperature liquid is heated in a high-temperature generator to a temperature that can be above the thermal decomposition temperature of the heat-transfer additive to produce a high-temperature vapor including refrigerant, and a high-temperature liquid including refrigerant and absorbent. The low-temperature vapor is condensed to form a condensed liquid including refrigerant and heat-transfer additive. The condensed liquid is then vaporized in an evaporator including an evaporator heat exchanger to cool a medium in the evaporator heat exchanger and to produce a vapor including refrigerant and heat-transfer additive. In an absorber, refrigerant vapor contained in the evaporated vapor is absorbed into a fluid including the high-temperature liquid, and heat-transfer additive contained in the evaporated vapor condenses on the surface of the fluid, to form the weak fluid.

In another aspect, the present invention includes inverse series and inverse series-parallel connected triple effect refrigeration methods and systems that unexpectedly decrease the operating temperature of the high-temperature generator and provide a high coefficient of performance when the pumping ratio is maintained within the range of 8–11.

In yet another aspect, the present invention includes inverse series connected triple effect refrigeration methods and systems that unexpectedly provide a high coefficient of performance and operate at a low temperature when the low-temperature heat exchanger has an effectiveness of approximately 0.68 to 0.74, the intermediate-temperature heat exchanger has an effectiveness of approximately 0.76 to 0.82, and the high temperature heat exchanger has an effectiveness of at least approximately 0.87.

In yet another aspect, the present invention includes inverse series-parallel connected triple effect refrigeration methods and systems that unexpectedly provide a high coefficient of performance and operate at a low temperature when the low-temperature heat exchanger has an effectiveness of approximately 0.81 to 0.87, the intermediate-temperature heat exchanger has an effectiveness of approximately 0.78 to 0.86, and the high temperature heat exchanger has an effectiveness of at least approximately 0.87.

It is to be understood that both the foregoing general description and the following detailed description are exemplary and explanatory only and are not restrictive of the invention as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

The invention is described by way of illustration only with reference to the detailed description, and to the drawings in which.

DESCRIPTION OF THE PREFERRED EMBODIMENTS

Figure 1:
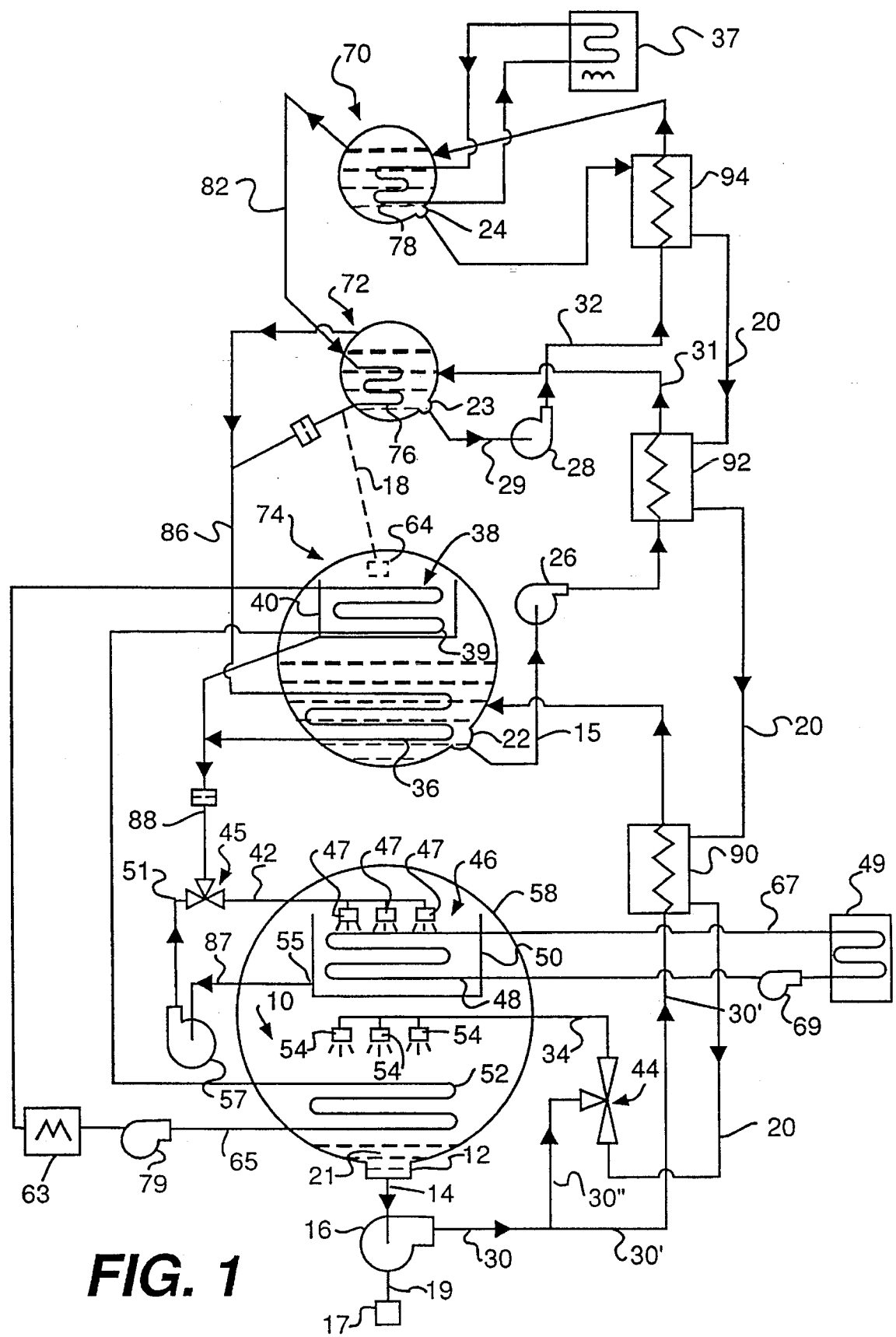
FIG. 1 is a schematic view, not according to scale, of an inverse series connected multiple effect absorption-type refrigeration system in accordance with the present invention.

Reference will now be made in detail to the present preferred embodiments of the invention, examples of which are illustrated in the accompanying drawings. Wherever possible, the same reference numbers will be used throughout the drawings to refer to the same or like parts.

A. Refrigerants, Absorbents, and Heat-Transfer Additives Useful In the Present Invention Absorption-type refrigeration methods and systems in accordance with the present invention use fluids including an absorbent, refrigerant, and heat-transfer additive. Preferably, the absorbent is a lithium bromide solution, the refrigerant is water, and the heat-transfer additive is 2-ethyl 1-hexanol (octyl alcohol). The invention, however, can be applied to systems and methods utilizing other types of absorbents, refrigerants, and heat-transfer additives.

For example, other organic heat-transfer additives suitable for use with aqueous lithium bromide, such as 1-amino nonane, are known or would be obvious to persons of ordinary skill in the art, once the principles and scope of the invention disclosed herein are understood. Heat-transfer additives other than octyl alcohol may be preferred if absorbents and refrigerants different from lithium bromide solution and water, respectively, are used. For example, nitrobenzene may be used as a heat-transfer additive in a fluid including lithium chlorate and water. 1-octanol, for example, may be used as a heat-transfer additive in a fluid including lithium bromide/ethylene glycol/water.

Other absorbents that can be used when water is the refrigerant include combinations of sodium and potassium hydroxide or combinations of lithium, zinc, and calcium bromides. Octyl alcohol will operate in combination with these fluids as a heat-transfer additive, although not as well as with a fluid including lithium bromide solution and water.

The present invention finds application for all combinations of refrigerants, absorbents, and heat-transfer additives in which the refrigerant has a lower boiling point than the absorbent. Moreover, for the purpose of the present invention, the refrigerant, absorbent, and heat-transfer additive fluid may include more than three components. For example, the absorbent alone may comprise two or more components. Similarly, other additives, such as corrosion inhibitors, may be present in the fluid. As will be appreciated by one skilled in the art, the present invention is applicable to a wide variety of such fluids.

B. Function of Heat-Transfer Additives

Adding a suitable heat-transfer additive to a system increases its cooling capacity. For example, a heat-transfer additive increases the rate of heat transfer in the absorber and the condenser, thereby increasing cooling capacity. More specifically, in regard to the absorber, the heat transfer additive increases the heat-transfer coefficient, thereby accelerating absorption of refrigerant vapor by strong fluid and heat-transfer from the strong fluid to a cooling liquid. When the absorbent and refrigerant are lithium bromide and water, respectively, adding octyl alcohol as the heat-transfer additive increases the heat-transfer coefficient from about 70–80 $Btu/ft^2$-° F.-hr to about 250 $Btu/ft^2$-° F-hr.

Furthermore, a heat-transfer additive reduces subcooling, which is a measure of the deviation of actual operating conditions from desired equilibrium conditions. Equilibrium exists when the weak fluid in the absorber has absorbed the maximum amount of refrigerant possible. Under normal operating conditions, however, the weak fluid does not stay in the absorber long enough to reach equilibrium. One observable consequence is that the weak fluid leaving the absorber contains more absorbent than is calculated from vapor pressure-temperature diagrams. Accordingly, the amount of cooling that is theoretically possible cannot be achieved, i.e., capacity decreases because no more refrigerant can be evaporated than can be absorbed. Generator temperature will likely increase as the system attempts to maintain the desired capacity by increasing the concentration of the strong fluid to compensate for the increased strength of the weak fluid leaving the absorber. The amount of cooling decreases as actual operating conditions deviate further from desired equilibrium conditions.

Subcooling of 0° corresponds to equilibrium. An advantage of a heat-transfer additive is that it brings subcooling closer to 0°. For example, in a system employing water as the refrigerant and lithium bromide as the absorbent, adding octyl alcohol as the heat-transfer additive may reduce subcooling from a typical 25° F. to about 1° F.

It is believed that use of a heat-transfer additive results in the agitation of surface films of the lithium bromide fluid on the heat-exchange tubes. A rather quiescent, glassy film of lithium bromide fluid flows over the absorber tubes when no heat-transfer additive is present. When the heat-transfer additive is present, the film is highly agitated, which is usually attributable to surface tension gradients. Agitation provides a better heat exchange than steady state films of fluids on the tubes. Agitation promotes more rapid mixing, which itself promotes both mass transfer (of vapor into the absorbent fluid) and heat-transfer (bringing the surface film, which has been warmed by heat of absorption, to the cold surface of the underlying heat-transfer tubes). The heat-transfer additive may be thought of as analogous to a chemical catalyst, a substance which accelerates a chemical process without itself being permanently altered.

The system requires relatively small quantities of heat-transfer additive. For example, when using octyl alcohol and aqueous lithium bromide, about 0.5 to 1.0 liters of octyl alcohol are sufficient for use with about 500 gallons of aqueous lithium bromide solution (approximately 55 to 58 weight percent of lithium bromide). It may be desirable to add more than this amount, however, to allow for trapping of the heat-transfer additive in the system. Trapping is a phenomenon whereby the heat-transfer additive is trapped or retained in various parts of the system. Moreover, heat-transfer additive may be lost in other ways, such as during purging of the system. It is recommended that at least three gallons of the heat-transfer additive octyl alcohol be added for each 500 gallons of aqueous lithium bromide to compensate for trapping or other losses. This proportion is believed to be appropriate regardless of the size or configuration of the system being employed.

Though heat-transfer additives improve the rate of heat-transfer in the absorber and condenser, they may decompose in very hot portions of the cycle. Such very hot portions typically exist in multiple effect absorption-type refrigeration systems where one or more of the generators have operating temperatures higher than the thermal decomposition temperature of the heat-transfer additive. The decomposition of the heat-transfer additive adversely affects the performance of the refrigeration system.

Figure 2:
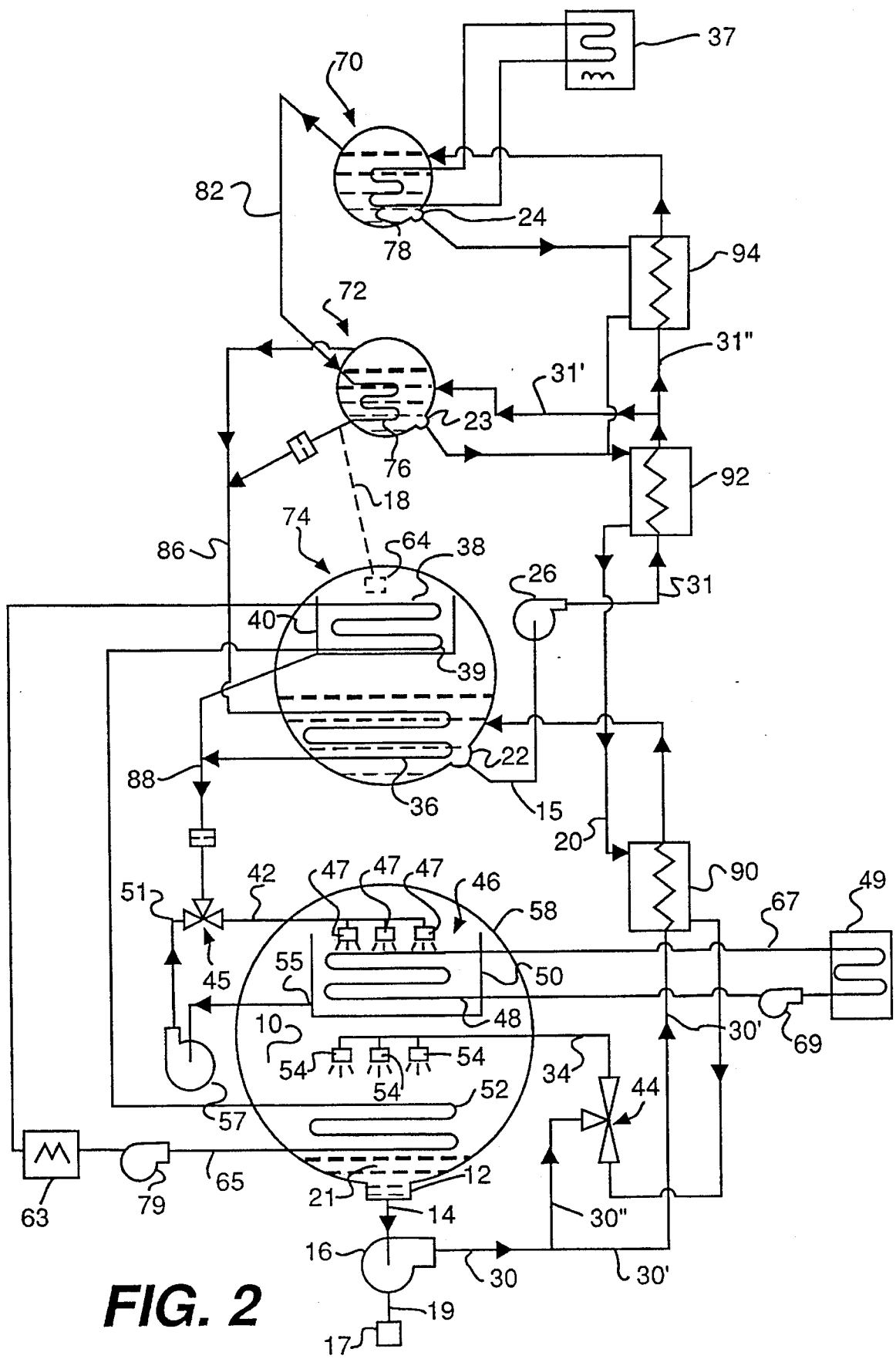
FIG. 2 is a schematic view, not according to scale, of an inverse series-parallel connected multiple effect absorption-type refrigeration system in accordance with the present invention.

C. Absorption-Type Refrigeration Systems In Accordance With the Present Invention Embodiments of absorption-type refrigeration systems in accordance with the present invention are shown in FIGS. 1 and 2. Evaporator 46 and absorber 10 are preferably contained within a common enclosure 58. In evaporator 46, spray headers 47 spray liquid refrigerant and heat-transfer additive onto evaporator coil 48, causing the refrigerant and heat-transfer additive to evaporate. Evaporator sump 50 collects any liquid refrigerant and heat-transfer additive that does not evaporate. Typically the evaporator sump 50 will contain an inventory or excess of refrigerant to allow for changes in operating conditions that may require more refrigerant.

Liquid in evaporator sump 50 preferably passes through an outlet 55 to a pump 57 that pumps the liquid through pipe 51 to eductor 45, where it is combined with condensed refrigerant and heat-transfer additive from the generators. Typically about one-eighth of the fluid provided to eductor 45 comes from the evaporator sump 50 and the other seven-eighths comes from the generators. The combined fluids flow through pipe 42 to spray headers 47. This recirculation of liquid refrigerant and heat-transfer additive within evaporator 46 enhances the evaporation of the refrigerant and heat-transfer additive and ensures that the volume of liquid refrigerant and heat-transfer additive is sufficient to wet the surface of evaporator coil 48. The high pressure refrigerant and heat-transfer additive issuing from the refrigerant pump 57 also serve to pump, via the eductor 45, refrigerant and heat-transfer additive returning from the generators.

The evaporation of liquid refrigerant and heat-transfer additive in the evaporator cools a coolant fluid (preferably water or water plus antifreeze) passing through evaporator coil 48 to a temperature of about 38° to 48° F., depending upon the load requirements. The cooling effect on the coolant fluid can be extracted from the evaporator by circulating the coolant fluid through a suitable work load for the refrigeration system, as generally indicated by heat exchanger 49. Pump 69 pumps the chilled coolant fluid to load 49 where it absorbs heat, increasing its temperature to, typically, 54° to 65° F. The warmed coolant fluid returns via pipe 67 to evaporator coil 48 where it is again chilled by transferring the heat it picked up from the load to the refrigerant and heat-transfer additive.

The refrigerant and heat-transfer additive vapor produced by evaporator 46 passes around the evaporator sump 50 and enters absorber 10. In absorber 10 a fluid including absorbent absorbs the refrigerant vapor, and the heat-transfer additive vapor condenses on the surface of the fluid, to form a weak fluid 21 including absorbent, refrigerant, and heat-transfer additive. The pressure within the evaporator-absorber shell 58 is the vapor pressure of water at the temperature of the water in evaporator 46, typically about 0.1 psia.

To facilitate the absorption of the refrigerant vapor and condensing of the heat-transfer additive vapor, the strong fluid may be cooled by spraying it through spray headers 54 and over heat exchanger coil 52. A cooling liquid from, for example, a cooling tower 63 may be circulated via pump 79 and pipe 65 through the heat exchanger coil 52. The preferred cooling liquid is non-scaling, noncorrosive water below 95° F. Though water from a pond, river, well, or ocean may be used as a cooling liquid, water from a cooling tower is preferred due to better control of temperature and quality of the cooling liquid.

After flowing over the heat exchanger coil 52, the strong fluid will be diluted until it nears equilibrium with the refrigerant vapor (subcooling of about 0°). The strong fluid, which is now weak, falls from the heat exchanger coil 52 into the fluid 21 in the sump of absorber 10. Absorber 10 includes an outlet 12 located substantially at its bottom, through which the weak fluid can exit. Preferably the outlet 12 includes a standpipe for accepting weak fluid located near the surface of the absorber sump so that the surface of the absorber sump does not act as an additive trap.

Fluid exiting from outlet 12 passes through pipe 14 to a first pump 16, which is driven by conventional means such as an electric motor 17 operating through a shaft 19. The pump 16 increases the fluid to generator pressure and preferably pumps the weak fluid through a conduit that supplies a first portion of the weak fluid to the low-temperature generator and returns a second portion of the weak fluid to the absorber. As shown in FIGS. 1 and 2, pipe 30 accepts weak fluid from the pump 16, feeds a portion of the fluid to the generators through pipe 30', and feeds the remaining portion of the fluid to eductor 44 through pipe 30".

Preferably, eductor 44 receives about 44% of the weak fluid pumped by pump 16. In eductor 44, the weak fluid combines with strong fluid from the generators. Spray headers 54 spray the combined fluids over heat exchanger coil 52.

The generators receive the remainder of the weak fluid pumped by pump 16. The generators separate refrigerant from absorbent by heating the weak fluid so that refrigerant evaporates but the absorbent remains in the liquid state. The concentrated absorbent returns to the absorber and the concentrated refrigerant returns to the evaporator.

The generators can be coupled to the absorber and evaporator by suitable piping or conduits in several desired configurations. For example, FIG. 1 shows an inverse series flow arrangement for directing the weak fluid through the generators. FIG. 2 shows an inverse series-parallel flow arrangement for directing the weak fluid through the generators.

1. Inverse Series Connected Multiple Effect Absorption-Type Refrigeration Systems In an embodiment of the present invention shown in FIG. 1, a low-temperature generator, an intermediate-temperature generator, and a high-temperature generator are coupled to an absorber in an inverse series flow arrangement.

Weak fluid from absorber 10 passes through low-temperature solution heat exchanger 90, which preheats the weak fluid before it enters low-temperature generator 74. More specifically, heat exchanger 90 places weak fluid in pipe 30' in heat exchange relationship with high-temperature liquid discharged from the high-temperature generator 70. The high-temperature liquid preferably flows through a pipe 20 that enters and exits heat exchanger 90. Preheating the weak fluid decreases the amount of heat that must be supplied by generator 74.

Low-temperature generator 74 is provided for accepting the weak fluid from the absorber 10 and heating it to a temperature sufficient to vaporize the refrigerant but below the thermal decomposition temperature of the heat-transfer additive to form a low-temperature vapor including refrigerant and heat-transfer additive vapor, and a low-temperature liquid including refrigerant and absorbent. As shown in FIG. 1, pipe 30' preferably delivers weak fluid into the sump of low-temperature generator 74. Alternatively, the incoming fluid in this generator, and the other generators, could be sprayed over the generator's tube bundle by a spray header. Either way, the weak fluid absorbs heat from vapor (from intermediate-temperature generator 72) condensing in first tube bundle 36, thereby vaporizing refrigerant in the weak fluid to form a low-temperature vapor including refrigerant and heat-transfer additive. The large volume of refrigerant vapor sweeps the small volume of relatively nonvolatile heat-transfer additive vapor out of the generator. As heat-transfer additive vapor replaces the additive vapor that was swept away, it too is swept away by refrigerant vapor. This steam distillation process evaporates nearly all of the relatively nonvolatile heat-transfer additive off of the weak fluid.

In the preferred embodiment, the generator pressure and the temperature and heat-transfer characteristics of the first tube bundle 36 are designed to remove most of the heat-transfer additive from the weak fluid applied to the low-temperature generator 74. In the preferred inverse series system, the low-temperature generator 74 need not remove all of the heat-transfer additive. At least one subsequent generator operates at temperatures below the thermal decomposition temperature of the heat-transfer additive. Thus, subsequent generator(s) can remove any heat-transfer additive in the fluid leaving the low-temperature generator, before supplying the fluid to a high-temperature generator.

As an example, for a 370 tons system in accordance with the present invention, the low-temperature generator typically operates at a pressure of about 0.94 psia and heats the weak fluid to a temperature of about 175° F. Those conditions are sufficient to remove refrigerant and most, if not all, of the heat-transfer additive. In this example, the low-temperature liquid exiting from generator 74 contains about 58.3% lithium bromide and 41.7% water and substantially lacks octyl alcohol, i.e., less than approximately 1 to 5 ppm.

Preferably, a condenser is provided in the low-temperature generator for condensing the low-temperature vapor to form a condensed liquid including refrigerant and heat-transfer additive. As shown in FIG. 1, the upper portion of low-temperature generator 74 houses a condenser 38 having a heat exchanger 39. In the preferred embodiment, heat exchanger 39 is interconnected to cooling tower 63 and heat exchanger coil 52 (in the absorber 10). Heat exchanger 39 in condenser 38 condenses evaporated refrigerant and heat-transfer additive to form a condensed liquid. Condenser receptacle 40 collects the condensed liquid, which then flows through pipe 88 to eductor 45.

The portion of the weak fluid that is not vaporized forms a low-temperature liquid including refrigerant and absorbent. The low-temperature liquid collects in the sump of low-temperature generator 74 and exits through an outlet 22.

Preferably an absorption-type refrigeration system in accordance with the present invention includes a second pump to pump the low-temperature liquid from the low-temperature generator through an intermediate-temperature heat exchanger to the intermediate-temperature generator. As embodied in FIG. 1, a pipe 15 conveys the low-temperature liquid from the outlet 22 to a pump 26. The pump 26 pumps the liquid to the intermediate-temperature generator 72 through a pipe 31.

Before entering generator 72, pipe 31 enters and exits intermediate-temperature solution heat exchanger 92 to preheat the low-temperature liquid. Heat exchanger 92 places the low-temperature liquid in pipe 31 in heat exchange relationship with the high-temperature liquid discharged from the high-temperature generator 70. The high-temperature liquid preferably flows through a pipe 20 that enters and exits the heat exchanger 92.

Intermediate-temperature generator 72 is preferably provided for accepting the low-temperature liquid and heating it to a temperature sufficient to vaporize the refrigerant but below the thermal decomposition temperature of the heat-transfer additive to form an intermediate-temperature vapor including refrigerant, and an intermediate temperature liquid including refrigerant and absorbent. Pipe 31 delivers the low-temperature liquid into the sump of intermediate-temperature generator 72. The low-temperature liquid absorbs heat from vapor (from high-temperature generator 70) condensing in second tube bundle 76, thereby vaporizing refrigerant in the low-temperature liquid. The refrigerant vapor sweeps away any heat-transfer additive remaining in the liquid and together they form an intermediate-temperature vapor. The intermediate-temperature vapor exits the intermediate-temperature generator 72 into pipe 86.

In the preferred embodiment, conditions in the intermediate-temperature generator 72 cause substantially all of the heat-transfer additive to boil off from the low-temperature liquid. For example, for a 370 tons system in accordance with the present invention, the intermediate-temperature generator typically operates at a pressure of about 7.5 psia and the low-temperature liquid is heated by the second tube bundle 76 to a temperature of about 266° F. In this example, the low-temperature liquid flowing from outlet 22 of low-temperature generator 74 contains approximately 57.9% lithium bromide, 42.1% water, and almost no octyl alcohol.

After transferring heat to the low-temperature liquid, the condensed refrigerant in the second tube bundle 76 enters pipe 86, where it is combined with the intermediate-temperature vapor produced by intermediate-temperature generator 72. Alternatively, the condensed refrigerant can be provided directly to condenser 38 by pipe 18 and spray header 64, which are shown in dashed lines. It is preferred that the condensed liquid enters pipe 86 and flows through first tube bundle 36, however, since some of its heat can be transferred to the weak fluid in low-temperature generator 74, resulting in a 10% increase in thermal efficiency.

The portion of the low-temperature liquid that is not vaporized by second tube bundle 76 forms an intermediate-temperature liquid including refrigerant and absorbent. The intermediate-temperature liquid collects in the sump of intermediate-temperature generator 72 and exits through an outlet 23.

Preferably an absorption-type refrigeration system in accordance with the present invention includes a third pump to pump the intermediate-temperature liquid from the intermediate-temperature generator through a high-temperature solution heat exchanger to the high-temperature generator. As shown in FIG. 1, a pipe 29 conveys the intermediate-temperature liquid from outlet 23 to a pump 28. The pump 28 pumps the liquid to the high-temperature generator 70 through a pipe 32.

Before entering high-temperature generator 70, pipe 32 passes through heat exchanger 94 to preheat the intermediate-temperature liquid. Heat exchanger 94 places the intermediate-temperature liquid in pipe 32 in heat exchange relationship with the high-temperature liquid discharged from the high-temperature generator 70. The high-temperature liquid flows through a pipe 20, which passes through the heat exchanger 94.

The high-temperature generator 70 is provided for accepting an intermediate-temperature liquid from the intermediate-temperature generator and heating the intermediate-temperature liquid to a temperature sufficient to vaporize the refrigerant and possibly above the thermal decomposition temperature of the heat-transfer additive to form a high-temperature vapor including refrigerant, and a high-temperature liquid including absorbent. Pipe 32 delivers intermediate-temperature liquid into the sump of high-temperature generator 70. The intermediate-temperature liquid absorbs heat from third tube bundle 78, thereby vaporizing refrigerant in the liquid to form a high-temperature vapor.

Preferably, a stream of hot fluid produced by a burner 37 heats third tube bundle 78. The burner 37 operates on a hydrocarbon fuel, such as natural gas or oil. Alternatively, third tube bundle 78 could be heated by a direct fire in the coil, which is conventional in the art, or by other means known to a person skilled in the art.

The high-temperature vapor flows through pipe 82 into second tube bundle 76. It is condensed in second tube bundle 76 and is preferably combined with the intermediate-temperature vapor in pipe 86.

The remainder of the intermediate-temperature liquid, which is not boiled off by the third tube bundle 78, forms a high-temperature liquid including absorbent, which collects in the sump of high-temperature generator 70. The high-temperature liquid or strong fluid can exit through an outlet 24 located substantially at the bottom of high-temperature generator 70. The high-temperature liquid returns to the absorber 10 after passing through the heat exchangers 94, 92, and 90.

As an example, for a 370 tons refrigeration system in accordance with the present invention, the operating pressure of the high-temperature generator is about 46.2 psia and the high-temperature liquid leaving the high-temperature generator 70 is at a temperature of about 386° F. In this example, the high-temperature liquid flowing from generator 70 contains about 62.96% lithium bromide, 37.04% water, and no significant amount of octyl alcohol.

As shown by the embodiment of the present invention depicted in FIG. 1, the low-temperature and intermediate-temperature generators remove refrigerant and substantially all of the heat-transfer additive from the fluid supplied to the high-temperature generator. Refrigerant and heat-transfer additive from the generators combine, in eductor 45, with refrigerant and heat-transfer additive from the evaporator sump 50. The combined fluid is sprayed onto the evaporator coil 48, thereby cooling the load 49. The resultant refrigerant and heat-transfer additive vapor flows into the absorber, and combines with the strong fluid returning from the generators to form a weak fluid and the cycle continues.

The exemplary generator pressures, temperatures, and fluid contents provided for this inverse series connected refrigeration system are based on a system operating at a pumping ratio of 10. A pumping ratio of 10 provides generator temperatures that are unexpectedly lower than those provided by the typical pumping ratio for triple effect systems, which is about 18. For example, with a pumping ratio of about 18, the temperature of the strong fluid leaving the high-temperature generator is typically at about 450° F. At such temperatures (generally above 400° F. where the heat-transfer additive is octyl alcohol), decomposition of heat-transfer additive may occur. Additionally, when the generator operates at temperatures greater than about 400° F., corrosion problems may occur. The use of corrosion resistant materials such as monel in the fabrication of the high-temperature components may be required to alleviate this problem.

Figure 3:
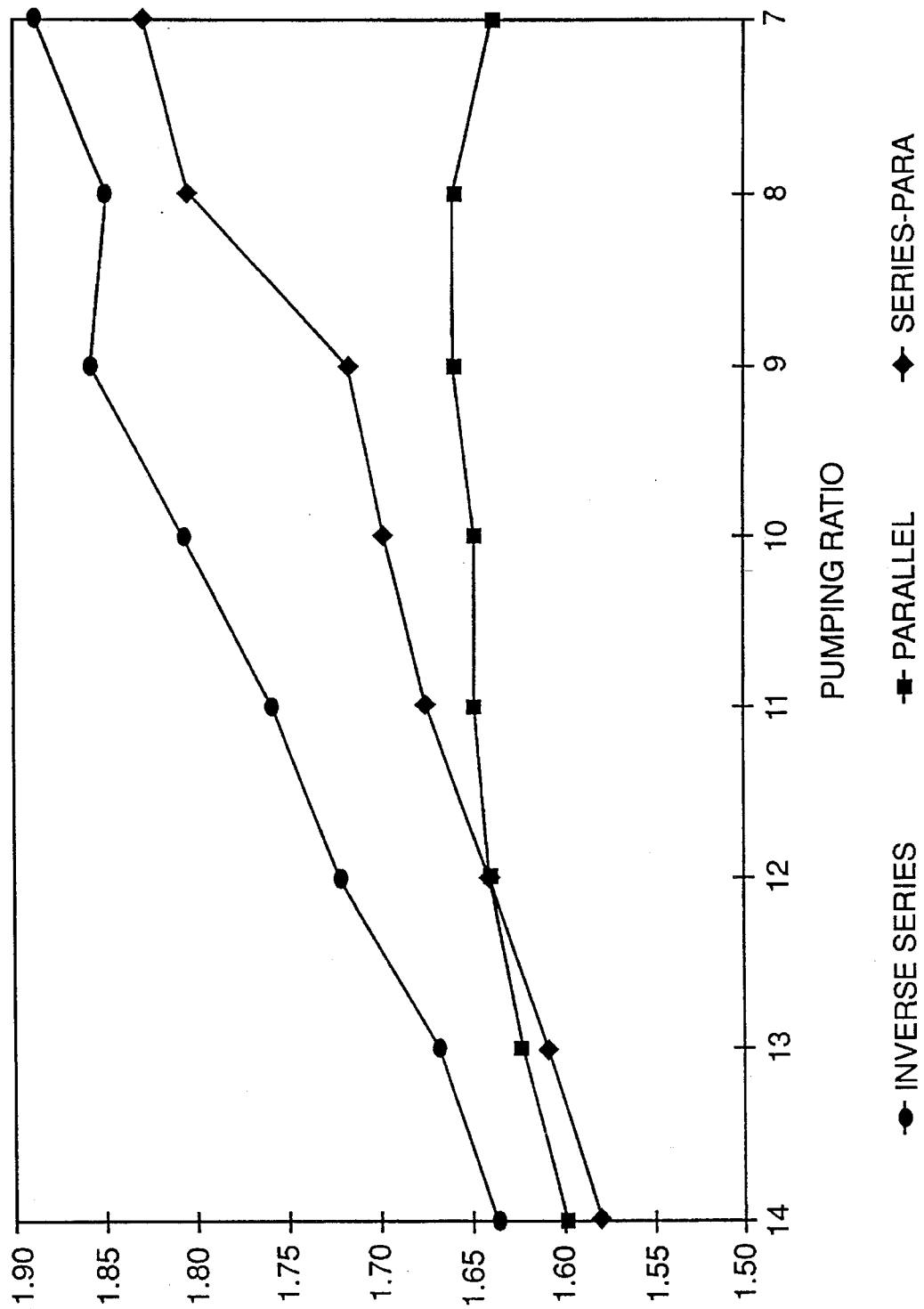
FIG. 3 shows the thermal coefficient of performance of triple effect systems at various pumping ratios.
Figure 4:
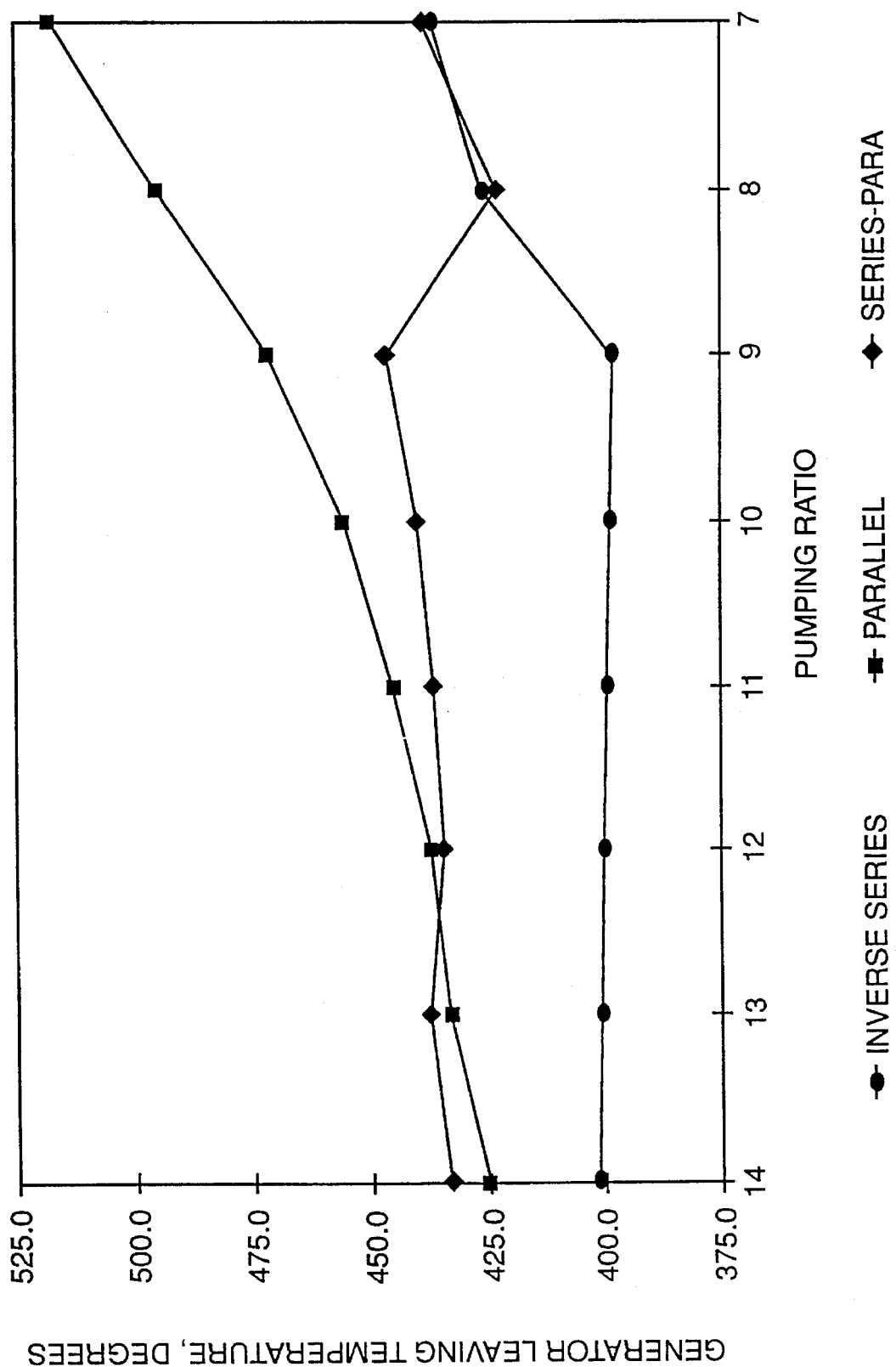
FIG. 4 shows the temperature of fluid leaving the high-temperature generator in triple effect systems at various pumping ratios.

As shown in FIG. 4, decreasing the pumping ratio to within the range of 8–11, and most preferably 10, unexpectedly reduces the operating temperature of the high-temperature generator and therefore minimizes the decomposition of heat transfer additive. To highlight the advantages provided by reducing the pumping ratio, FIGS. 3 and 4 illustrate the performance of 400 tons systems, wherein the heat exchanger effectivenesses of the system are not optimized in accordance with the present invention. The systems of FIGS. 3 and 4 have effectivenesses of 0.72, 0.80, and 0.80 for the low-temperature, intermediate-temperature, and high-temperature heat exchangers, respectively.

Preferably the pumping ratio is decreased by supplying only a first portion of the weak fluid from the absorber to the generators and returning a second or remaining portion of the weak fluid to the absorber. Most preferably, about 56% of the weak fluid is provided to the generators and about 44% of the weak fluid is returned to the absorber. The pumping ratio also can be decreased by slowing down the pump, throttling a valve in the pipe leading to the generator, or other methods that will be apparent to one of ordinary skill in the art upon reading this disclosure. However, recirculation of the weak fluid to the absorber is preferred because it ensures that there is enough fluid to wet the heat exchanger coil 52.

Though generator temperature typically increases when the pumping ratio is decreased, the temperature of the strong fluid leaving the high-temperature generator in the inverse series connected system of the present invention does not increase significantly when the pumping ratio is decreased. More importantly, as shown in FIG. 3, the coefficient of performance of the inverse series connected system increases markedly as the pumping ratio is decreased. It is believed that reducing the pumping ratio reduces the weak fluid flow through the heat exchangers, decreases the load on the heat exchangers, and reduces losses in the heat exchangers, thereby boosting the system's coefficient of performance.

Furthermore, the generator pressures, temperatures, and fluid contents listed as examples were determined by decreasing the effectiveness of some heat exchangers below the typically used effectiveness. Solution heat exchangers can be designed by methods known in the art to provide varying degrees of effectiveness. Typically it has been accepted that increasing the effectiveness of the heat exchangers would increase the performance of the system. As shown in Table 1, however, the inverse series refrigeration system of the present invention acts in a surprisingly different manner. Decreasing the effectiveness of some of the heat exchangers unexpectedly improves the performance of the inverse series system.

As shown in Table 1, the system initially shows the expected increase in performance as the effectiveness of the low-temperature heat exchanger is increased. However, at an effectiveness of about 0.76, the system undergoes a significant increase in temperature in the high-temperature generator and a decrease in performance. A preferred effectiveness for the low-temperature heat exchanger is from about 0.68 to 0.74, and most preferably about 0.74.

The system exhibits very similar behavior when the effectiveness of the intermediate-temperature heat exchanger is modified. However, its effectiveness can be increased up to about 0.82 without suffering a significant increase in generator temperature or decrease in coefficient of performance. A preferred effectiveness for the high-temperature heat exchanger is from about 0.76 to 0.82, and most preferably about 0.82.

The system acts in the expected manner when altering the effectiveness of the high-temperature heat exchanger. Increasing the effectiveness of the high-temperature heat exchanger lowers the temperature of the high-temperature generator and increases the system's coefficient of performance. A preferred effectiveness for the high-temperature heat exchanger would be 1 if it were economically practical. At present, the preferred effectiveness is the highest economically practicable effectiveness, which is about 0.87.

TABLE 1

EFFECT OF HEAT EXCHANGER EFFECTIVENESS ON THE INVERSE SERIES TRIPLE EFFECT SYSTEM

| Low-temp. Exchanger | Int.-temp. Exchanger | High-temp. Exchanger | Generator Temp. (°F.) | COP |
|---|---|---|---|---|
| 0.64 | 0.80 | 0.80 | 387 | 1.81 |
| 0.66 | 0.80 | 0.80 | 387 | 1.82 |
| 0.68 | 0.80 | 0.80 | 388 | 1.83 |
| 0.70 | 0.80 | 0.80 | 388 | 1.84 |
| 0.72 | 0.80 | 0.80 | 388 | 1.84 |
| 0.74 | 0.80 | 0.80 | 389 | 1.85 |
| 0.76 | 0.80 | 0.80 | 407 | 1.82 |
| 0.78 | 0.80 | 0.80 | 410 | 1.83 |
| 0.80 | 0.80 | 0.80 | 412 | 1.83 |
| 0.82 | 0.80 | 0.80 | 414 | 1.83 |
| 0.74 | 0.76 | 0.80 | 389 | 1.82 |
| 0.74 | 0.78 | 0.80 | 389 | 1.83 |
| 0.74 | 0.80 | 0.80 | 389 | 1.85 |
| 0.74 | 0.82 | 0.80 | 389 | 1.87 |
| 0.74 | 0.84 | 0.80 | 407 | 1.85 |
| 0.74 | 0.86 | 0.80 | 408 | 1.86 |
| 0.74 | 0.88 | 0.80 | 409 | 1.88 |
| 0.74 | 0.82 | 0.70 | 396 | 1.76 |
| 0.74 | 0.82 | 0.80 | 389 | 1.87 |
| 0.74 | 0.82 | 0.85 | 386 | 1.92 |
| 0.74 | 0.82 | 0.87 | 385 | 1.94 |

The inverse series methods and systems of the present invention ensure that little, if any, heat-transfer additive reaches high-temperature generator 70 and therefore minimize additive decomposition. The present invention further minimizes decomposition of the heat-transfer additive by reducing the temperature in the high-temperature generator. Furthermore, the present invention provides higher coefficients of performance. In other words, the inverse series connected methods and systems of the present invention provide higher coefficients of performance than the parallel connected triple effect system (under comparable conditions), operate at temperatures so low that thermal decomposition of the heat-transfer additive should not be a problem, and, even if temperatures become excessive, do not expose the heat-transfer additive to the excessively hot portions of the cycle.

2. Inverse series-parallel Connected Multiple Effect Absorption-Type Refrigeration Systems In another embodiment of the present invention shown in FIG. 2, a low-temperature generator, an intermediate-temperature generator and a high-temperature generator are arranged in an inverse series-parallel flow arrangement.

Weak fluid from absorber 10 passes through low-temperature solution heat exchanger 90, which preheats the weak fluid before it enters low-temperature generator 74. Heat exchanger 90 places weak fluid in pipe 30' in heat exchange relationship with high-temperature liquid discharged from the high-temperature generator 70 and intermediate-temperature liquid discharged from the intermediate-temperature generator 72. The high-temperature and intermediate-temperature liquids preferably flow through a pipe 20 that enters and exits the heat exchanger 90.

Low-temperature generator 74 is provided for accepting the weak fluid from the absorber 10 and heating it to a temperature sufficient to vaporize the refrigerant but below the thermal decomposition temperature of the heat-transfer additive to form a low-temperature vapor including refrigerant and heat-transfer additive vapor, and a low-temperature liquid including refrigerant and absorbent liquid. As shown in FIG. 2, pipe 30' delivers weak fluid into the sump of low-temperature generator 74. The weak fluid absorbs heat from vapor (from intermediate-temperature generator 72) condensing in first tube bundle 36, thereby vaporizing refrigerant in the weak fluid to form a low-temperature vapor including refrigerant and heat-transfer additive. The large volume of refrigerant vapor sweeps the small volume of relatively nonvolatile heat-transfer additive out of the generator.

In the preferred embodiment, the generator pressure and the temperature and heat-transfer characteristics of the first tube bundle are designed to remove substantially all of the heat-transfer additive from the weak fluid applied to the low-temperature generator. In the inverse series-parallel system, the low-temperature generator must remove almost all of the heat-transfer additive, since it supplies fluid directly to a high-temperature generator.

For example, for a 370 tons system in accordance with the present invention, the low-temperature generator typically operates at a pressure of about 0.94 psia and heats the weak fluid to a temperature of about 164° F. Those conditions are sufficient to remove refrigerant and most, if not all, of the heat-transfer additive. In this example, the low-temperature liquid exiting from generator flowing from generator 74 contains approximately 55.0% lithium bromide and 45.0% water and substantially lacks octyl alcohol, i.e, less than approximately 1 to 5 ppm.

Preferably, a condenser is provided in the low-temperature generator for condensing the low-temperature vapor to form a condensed liquid including refrigerant and heat-transfer additive. As shown in FIG. 2, the upper portion of low-temperature generator 74 houses a condenser 38 having a heat exchanger 39. In the preferred embodiment, heat exchanger 39 is interconnected to cooling tower 63 and heat exchanger coil 52 (in the absorber 10). Heat exchanger 39 condenses evaporated refrigerant and heat-transfer additive to form a condensed liquid. Condenser receptacle 40 collects the condensed liquid, which then flows through pipe 88 to eductor 45.

The portion of the weak fluid that is not vaporized forms a low-temperature liquid including refrigerant and absorbent. The low-temperature liquid collects in the sump of generator 74 and exits through an outlet 22.

Preferably an absorption-type refrigeration system in accordance with the present invention includes a second pump to pump the low-temperature liquid from the low-temperature generator through an intermediate-temperature solution heat exchanger to the intermediate-temperature generator and through a high-temperature solution heat exchanger to the high-temperature generator. As shown in FIG. 2, a pipe 15 conveys the low-temperature liquid from the outlet 22 to a pump 26. The pump 26 pumps the liquid through a pipe 31, which enters, then exits, heat exchanger 92. In heat exchanger 92 the fluid in pipe 31 is placed in heat exchange relationship with the high-temperature liquid discharged from high-temperature generator 70 and the intermediate-temperature liquid discharged from intermediate-temperature generator 72.

Pipe 31 then splits into pipe 31' and pipe 31". Pipe 31' enters generator 72. Pipe 31" enters and exits heat exchanger 94 before entering high-temperature generator 70. In heat exchanger 94, the fluid in pipe 31" is placed in heat exchange relationship with the high-temperature liquid discharged from the high-temperature generator 70.

Intermediate-temperature generator 72 is preferably provided for accepting a first portion of the low-temperature liquid and heating it to a temperature sufficient to vaporize the refrigerant but below the thermal decomposition temperature of the heat-transfer additive to form an intermediate-temperature vapor including refrigerant and an intermediate-temperature liquid including absorbent. Pipe 31' delivers low-temperature liquid into the sump of intermediate-temperature generator 72. The low-temperature liquid absorbs heat from vapor (from high-temperature generator 70) condensing in second tube bundle 76, thereby vaporizing refrigerant in the low-temperature liquid to form an intermediate-temperature vapor. The intermediate-temperature vapor exits the intermediate-temperature generator 72 into pipe 86.

As an example, for a 370 tons system in accordance with the present invention, the intermediate-temperature generator operates at a pressure of about 7.85 psia and the low-temperature liquid is heated by the second tube bundle 76 to a temperature of about 275° F. In this example, the intermediate-temperature liquid flowing from outlet 23 contains approximately 59.95% lithium bromide, 40.05% water, and no significant amount of octyl alcohol.

After transferring heat to the low-temperature liquid, the condensed refrigerant in the second tube bundle 76 enters pipe 86 or, alternatively, is provided directly to condenser 38 by pipe 18 and spray header 64. Preferably the liquid refrigerant enters pipe 86 and flows through first tube bundle 36, because that arrangement results in a 10% increase in thermal efficiency.

The portion of the low-temperature liquid that is not vaporized by second tube bundle 76 forms an intermediate-temperature liquid including refrigerant and absorbent. The intermediate-temperature liquid collects in the sump of generator 72 and exits through an outlet 23. As shown in FIG. 2, the intermediate-temperature liquid is preferably returned to absorber 10, after passing through heat exchangers 92 and 90.

The high-temperature generator is provided for accepting a second portion of the low-temperature liquid from low-temperature generator 74 and heating it to a temperature sufficient to vaporize the refrigerant and possibly above the thermal decomposition temperature of the heat-transfer additive to form a high-temperature vapor including refrigerant and a high-temperature liquid including refrigerant and absorbent. As shown in FIG. 2, pipe 31" delivers low-temperature liquid into the sump of high-temperature generator 70. The low-temperature liquid absorbs heat from third tube bundle 78, thereby vaporizing refrigerant in the liquid to form a high-temperature vapor.

The high-temperature vapor flows through pipe 82 into second tube bundle 76. It is condensed in second tube bundle 76 and is preferably combined with the intermediate-temperature vapor in pipe 86.

The remainder of the low-temperature liquid, which is not boiled off by the third tube bundle 78, forms a high-temperature liquid including absorbent, which collects in the sump of high-temperature generator 70. High-temperature generator 70 includes an outlet 24 located substantially at its bottom, through which the high-temperature liquid can exit. The high-temperature liquid returns to the absorber 10 after passing through the heat exchangers 94, 92, and 90.

As an example, for a 370 tons system in accordance with the present invention, high-temperature generator 70 operates at a pressure of about 49.2 psia and the liquid in high-temperature generator 70 is heated to a temperature of about 388° F. In this example, the high-temperature liquid or strong fluid flowing from generator 70 contains about 62.96% lithium bromide, 37.04% water, and no significant amount of octyl alcohol.

As shown by the embodiment of the present invention depicted in FIG. 2, the low-temperature generator removes refrigerant and substantially all of the heat-transfer additive from the fluid before it is supplied to the intermediate and high-temperature generators. In the intermediate and high-temperature generators, more refrigerant is removed from the fluid. Refrigerant and heat-transfer additive from the generators combine, in eductor 44, with refrigerant and heat-transfer additive from the evaporator sump 50. The combined fluid is sprayed onto the evaporator coil 48, thereby cooling the load 49. The resultant refrigerant and heat-transfer additive vapor flows into the absorber, and combines with the strong fluid returning from the generators to form a weak fluid and the cycle continues.

The exemplary generator pressures, temperatures, and fluid contents listed above for the inverse series-parallel connected refrigeration system are based on a system operating at a pumping ratio of 10. Though the typical pumping ratio is 18, it has been discovered that the system operates at unexpectedly higher performance and lower temperature when the pumping ratio is decreased to within the range of 8–11, and most preferably 10.

As shown in FIG. 4, the temperature of the strong fluid leaving the high-temperature generator in the inverse series-parallel connected system of the present invention does not increase significantly when the pumping ratio is decreased. More importantly, as shown in FIG. 3, the coefficients of performance of the inverse series-parallel connected system increases markedly as the pumping ratio is decreased.

Furthermore, the exemplary generator pressures, temperatures, and fluid contents listed above were obtained by decreasing the effectiveness of some heat exchangers below the typically used effectiveness. As shown in Table 2, the performance of the inverse series-parallel system of the present invention can be unexpectedly improved by using heat exchangers having lower levels of effectiveness. As shown in Table 2, the system initially shows the expected increase in temperature and performance as the effectiveness of the low-temperature heat exchanger is increased. However, at an effectiveness of about 0.81, the system undergoes an abrupt drop in temperature in the high-temperature generator and a significant increase in coefficient of performance. Further increases in effectiveness above about 0.87 cause minor improvement of the system's coefficient of performance but cause significant increase in the generator temperature. A preferred effectiveness for the low-temperature heat exchanger is from about 0.81 to 0.87, and most preferably about 0.82.

Increasing the effectiveness of the intermediate-temperature heat exchanger causes a regular but minor increase in generator temperature and coefficient of performance. A preferred effectiveness for the intermediate-temperature heat exchanger is from about 0.78 to 0.86, and most preferably about 0.83.

In the high-temperature heat exchanger, improving effectiveness yields improvement of performance without meaningful alteration of generator temperature. A preferred effectiveness for the high-temperature heat exchanger would be 1 if it were economically practical. At present, the preferred effectiveness is the highest economically practicable effectiveness, which is about 0.87.

TABLE 2

EFFECT OF HEAT EXCHANGER EFFECTIVENESS ON THE INVERSE SERIES-PARALLEL TRIPLE EFFECT SYSTEM

| Low-temp. Exchanger | Int.-temp. Exchanger | High-temp. Exchanger | Generator Temp. (°F.) | COP |
|---|---|---|---|---|
| 0.69 | 0.80 | 0.80 | 425 | 1.69 |
| 0.72 | 0.80 | 0.80 | 426 | 1.70 |
| 0.75 | 0.80 | 0.80 | 427 | 1.71 |
| 0.78 | 0.80 | 0.80 | 430 | 1.73 |
| 0.81 | 0.80 | 0.80 | 389 | 1.86 |
| 0.84 | 0.80 | 0.80 | 390 | 1.87 |
| 0.87 | 0.80 | 0.80 | 392 | 1.89 |
| 0.818 | 0.78 | 1.0 | 389 | 1.84 |
| 0.818 | 0.80 | 1.0 | 389 | 1.86 |
| 0.818 | 0.82 | 1.0 | 390 | 1.88 |
| 0.818 | 0.84 | 1.0 | 391 | 1.91 |
| 0.818 | 0.86 | 1.0 | 392 | 1.93 |
| 0.818 | 0.834 | 0.80 | 391 | 1.91 |
| 0.818 | 0.834 | 0.82 | 390 | 1.92 |
| 0.818 | 0.834 | 0.84 | 390 | 1.94 |
| 0.818 | 0.834 | 0.86 | 389 | 1.95 |

The present invention reduces additive decomposition by ensuring that little, if any, heat-transfer additive reaches high-temperature generator 70 and by reducing the temperature in the high-temperature generator. The operating temperature and coefficient of performance of the inverse series-parallel refrigeration system are not as desirable as those of the preferred inverse series refrigeration system. However, it is advantageous over the inverse series cycle in that it uses one less (high-temperature) pump. Furthermore, the inverse series-parallel refrigeration system does provide a coefficient of performance better than the parallel cycle at a lower generator temperature.

Although particular embodiments of the invention have been described in detail for purposes of illustration, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An absorption-type refrigeration system, comprising:

an absorber in which a fluid including absorbent, refrigerant, and heat-transfer additive absorbs refrigerant vapor, and heat-transfer additive vapor condenses on the surface of the fluid, to form a weak fluid;

a low-temperature generator for heating the weak fluid to a temperature sufficient to vaporize the refrigerant but below the thermal decomposition temperature of the heat-transfer additive to form a low-temperature vapor including refrigerant and heat-transfer additive, and a low-temperature liquid including refrigerant and absorbent;

an intermediate-temperature generator for heating the low-temperature liquid to a temperature sufficient to vaporize the refrigerant but below the thermal decomposition temperature of the heat-transfer additive to form an intermediate-temperature vapor including refrigerant and heat-transfer additive, and an intermediate-temperature liquid including absorbent but substantially lacking heat-transfer additive;

a high-temperature generator for heating the intermediate-temperature liquid to a temperature sufficient to vaporize the refrigerant to form a high-temperature vapor including refrigerant, and a high-temperature liquid including absorbent;

a condenser for condensing the low-temperature vapor to form a condensed liquid including refrigerant and heat-transfer additive;

an evaporator including an evaporator heat exchanger for vaporizing at least the condensed liquid to cool a medium in the evaporator heat exchanger and to form vapor including refrigerant and heat-transfer additive that is applied to the absorber; and a low-temperature heat exchanger having an effectiveness within the range of 0.68 to 0.74 that places the weak fluid in a heat exchange relationship with the high-temperature liquid, to heat the weak fluid before entering the low-temperature generator.

2. An absorption-type refrigeration system, comprising:

an absorber in which a fluid including absorbent, refrigerant, and heat-transfer additive absorbs refrigerant vapor, and heat-transfer additive vapor condenses on the surface of the fluid, to form a weak fluid;

a low-temperature generator for heating the weak fluid to a temperature sufficient to vaporize the refrigerant but below the thermal decomposition temperature of the heat-transfer additive to form a low-temperature vapor including refrigerant and heat-transfer additive, and a low-temperature liquid including refrigerant and absorbent;

an intermediate-temperature generator for heating the low-temperature liquid to a temperature sufficient to vaporize the refrigerant but below the thermal decomposition temperature of the heat-transfer additive to form an intermediate-temperature vapor including refrigerant and heat-transfer additive, and an intermediate-temperature liquid including absorbent but substantially lacking heat-transfer additive;

a high-temperature generator for heating the intermediate-temperature liquid to a temperature sufficient to vaporize the refrigerant to form a high-temperature vapor including refrigerant, and a high-temperature liquid including absorbent;

a condenser for condensing the low-temperature vapor to form a condensed liquid including refrigerant and heat-transfer additive; and an evaporator including an evaporator heat exchanger for vaporizing at least the condensed liquid to cool a medium in the evaporator heat exchanger and to form a vapor including refrigerant and heat-transfer additive that is applied to the absorber;

wherein the pumping ratio of the system is within a range of 8 to 11.

3. The absorption-type refrigeration system of claim 2, further comprising:

a third tube bundle in the high-temperature generator for placing an external source of heat in heat exchange relationship with the intermediate-temperature liquid to heat the intermediate-temperature liquid;

a second tube bundle in the intermediate-temperature generator for placing the high-temperature vapor in heat exchange relationship with the low-temperature liquid from the low-temperature generator to heat the low-temperature liquid and to condense the high-temperature vapor; and a first tube bundle in the low-temperature generator for placing the intermediate-temperature vapor from the intermediate-temperature generator combined with the condensed high-temperature vapor that passed through the second tube bundle in heat exchange relationship with the weak fluid to heat the weak fluid and to condense the intermediate-temperature vapor.

4. An absorption-type refrigeration system, comprising:

an absorber in which a fluid including absorbent, refrigerant, and heat-transfer additive absorbs refrigerant vapor, and heat-transfer additive vapor condenses on the surface of the fluid, to form a weak fluid;

a low-temperature generator for heating the weak fluid to a temperature sufficient to vaporize the refrigerant but below the thermal decomposition temperature of the heat-transfer additive to form a low-temperature vapor including refrigerant and heat-transfer additive and a low-temperature liquid including refrigerant and absorbent but substantially lacking heat-transfer additive;

an intermediate-temperature generator for heating a first portion of the low-temperature liquid to a temperature sufficient to vaporize the refrigerant but below the thermal decomposition temperature of the heat-transfer additive to form an intermediate-temperature vapor including refrigerant and an intermediate-temperature liquid including absorbent;

a high-temperature generator for heating a second portion of the low-temperature liquid to a temperature sufficient to vaporize the refrigerant to form a high-temperature vapor including refrigerant and a high-temperature liquid including absorbent;

a condenser for condensing the low-temperature vapor to form a condensed liquid including refrigerant and heat-transfer additive; and an evaporator including an evaporator heat exchanger for vaporizing at least the condensed liquid to cool a medium in the evaporator heat exchanger and to form a vapor including refrigerant and heat-transfer additive for application to the absorber;

wherein the pumping ratio of the system is within a range of 8 to 11.

5. The absorption-type refrigeration system of claim 4, further comprising a conduit for accepting weak fluid from the absorber and supplying a first portion of the weak fluid to the low-temperature generator and returning a second portion of the weak fluid to the absorber.

6. An absorption-type refrigeration system, comprising:

an absorber in which a fluid including absorbent, refrigerant, and heat-transfer additive absorbs refrigerant vapor, and heat-transfer additive vapor condenses on the surface of the fluid, to form a weak fluid;

a low-temperature generator for heating the weak fluid to a temperature sufficient to vaporize the refrigerant but below the thermal decomposition temperature of the heat-transfer additive to form a low-temperature vapor including refrigerant and heat-transfer additive and a low-temperature liquid including refrigerant and absorbent but substantially lacking heat-transfer additive;

an intermediate-temperature generator for heating a first portion of the low-temperature liquid to a temperature sufficient to vaporize the refrigerant but below the thermal decomposition temperature of the heat-transfer additive to form an intermediate-temperature vapor including refrigerant and an intermediate-temperature liquid including absorbent;

a high-temperature generator for heating a second portion of the low-temperature liquid to a temperature sufficient to vaporize the refrigerant to form a high-temperature vapor including refrigerant and a high-temperature liquid including absorbent;

a condenser for condensing the low-temperature vapor to form a condensed liquid including refrigerant and heat-transfer additive;

an evaporator including an evaporator heat exchanger for vaporizing at least the condensed liquid to cool a medium in the evaporator heat exchanger and to form a vapor including refrigerant and heat-transfer additive for application to the absorber;

an intermediate-temperature heat exchanger for placing the low-temperature liquid in a heat-exchange relationship with the intermediate-temperature liquid and the high-temperature liquid to heat the low-temperature liquid; and a low-temperature heat exchanger having an effectiveness within the range of 0.81 to 0.87 for placing the weak fluid in a heat exchange relationship with the high-temperature liquid and the intermediate-temperature liquid that passed through the intermediate-temperature heat exchanger to heat the weak fluid.

7. The absorption-type refrigeration system of claim 4, further comprising:

a third tube bundle in the high-temperature generator for placing an external source of heat in heat exchange relationship with the second portion of the low-temperature liquid to heat the second portion of the low-temperature liquid;

a second tube bundle in the intermediate-temperature generator for placing the high-temperature vapor in heat exchange relationship with the first portion of the low-temperature liquid to heat the first portion of the low-temperature liquid and condense the high-temperature vapor; and a first tube bundle in the low-temperature generator for placing the intermediate-temperature vapor combined with the condensed high-temperature vapor that passed through the second tube bundle in heat exchange relationship with the weak fluid to heat the weak fluid and condense the intermediate-temperature vapor.

8. A method of reducing thermal decomposition of a heat-transfer additive in an absorption-type refrigeration system using a fluid including a refrigerant, an absorbent, and a heat-transfer additive comprising the steps of:

heating a weak fluid including refrigerant, absorbent and heat-transfer additive in a low-temperature generator to a temperature sufficient to vaporize the refrigerant but below the thermal decomposition temperature of the heat-transfer additive to form a low-temperature vapor including refrigerant and heat-transfer additive, and a low-temperature liquid including refrigerant and absorbent but substantially lacking heat-transfer additive;

heating the low-temperature liquid in a high-temperature generator to a temperature above the thermal decomposition temperature of the heat-transfer additive to produce a high-temperature vapor including refrigerant, and a high-temperature liquid including refrigerant and absorbent;

condensing the low-temperature vapor to form a condensed liquid including refrigerant and heat-transfer additive liquid;

vaporizing the condensed liquid in an evaporator including an evaporator heat exchanger to cool a medium in the evaporator heat exchanger and to produce an evaporator vapor including refrigerant and heat-transfer additive;

exposing the evaporator vapor to a fluid including the high-temperature liquid in an absorber so that refrigerant from the evaporator vapor is absorbed by the fluid and heat-transfer additive from the evaporator vapor condenses on the surface of the fluid to form the weak fluid; and maintaining a pumping ratio within a range of 8 to 11.

9. A method of reducing thermal decomposition of a heat-transfer additive in an absorption-type refrigeration system using a fluid including a refrigerant, an absorbent, and a heat-transfer additive comprising the steps of:

heating a weak fluid including refrigerant, absorbent and heat-transfer additive in a low-temperature generator to a temperature sufficient to vaporize the refrigerant but below the thermal decomposition temperature of the heat-transfer additive to form a low-temperature vapor including refrigerant and heat-transfer additive and a low-temperature liquid including refrigerant and absorbent;

heating the low-temperature liquid in an intermediate-temperature generator to a temperature sufficient to vaporize the refrigerant but below the thermal decomposition temperature of the heat-transfer additive to form an intermediate-temperature vapor including refrigerant and heat-transfer additive and an intermediate-temperature liquid including absorbent but substantially lacking heat-transfer additive;

heating the intermediate-temperature liquid in a high-temperature generator to a temperature sufficient to vaporize the refrigerant to produce a high-temperature vapor including refrigerant and a high-temperature liquid including absorbent;

condensing the low-temperature vapor to form a condensed liquid including refrigerant and heat-transfer additive liquid;

vaporizing the condensed liquid in an evaporator including an evaporator heat exchanger to cool a medium in the evaporator heat exchanger and to produce an evaporator vapor including refrigerant and heat-transfer additive;

exposing the evaporator vapor to a fluid including the high-temperature liquid in an absorber so that refrigerant from the evaporator vapor is absorbed by the fluid and heat-transfer additive from the evaporator vapor condenses on the surface of the fluid to form the weak fluid; and maintaining a pumping ratio within a range of 8 to 11.

10. A method of reducing thermal decomposition of a heat-transfer additive in an absorption-type refrigeration system using a fluid including a refrigerant, an absorbent, and a heat-transfer additive comprising the steps of:

heating a weak fluid including refrigerant, absorbent, and heat-transfer additive in a low-temperature generator to a temperature sufficient to vaporize the refrigerant but below the thermal decomposition temperature of the heat-transfer additive to form a low-temperature vapor including refrigerant and heat-transfer additive and a low-temperature liquid including refrigerant and absorbent;

heating the low-temperature liquid in an intermediate-temperature generator to a temperature sufficient to vaporize the refrigerant but below the thermal decomposition temperature of the heat-transfer additive to form an intermediate-temperature vapor including refrigerant and heat-transfer additive and an intermediate-temperature liquid including absorbent but substantially lacking heat-transfer additive;

heating the intermediate-temperature liquid in a high-temperature generator to a temperature sufficient to vaporize the refrigerant to produce a high-temperature vapor including refrigerant and a high-temperature liquid including absorbent;

condensing the low-temperature vapor to form a condensed liquid including refrigerant and heat-transfer additive liquid;

vaporizing the condensed liquid in an evaporator including an evaporator heat exchanger to cool a medium in the evaporator heat exchanger and to produce an evaporator vapor including refrigerant and heat-transfer additive;

exposing the evaporator vapor to a fluid including the high-temperature liquid in an absorber so that refrigerant from the evaporator vapor is absorbed by the fluid and heat-transfer additive from the evaporator vapor condenses on the surface of the fluid to form the weak fluid;

placing the weak fluid in a heat exchange relationship with the high-temperature liquid to heat the weak fluid before entering the low-temperature generator, wherein the effectiveness of the heat exchange between the high-temperature liquid and the weak fluid is within the range of 0.81 to 0.87.

11. The method of claim 9, further comprising the steps of:

placing an external source of heat in heat exchange relationship with the intermediate-temperature liquid in the high-temperature generator to heat the intermediate-temperature liquid;

placing the high-temperature vapor in heat exchange relationship with the low-temperature liquid in the intermediate-temperature generator to heat the low-temperature liquid and to condense the high-temperature vapor; and placing the intermediate-temperature vapor combined with the condensed high-temperature vapor in heat exchange relationship with the weak fluid in the low-temperature generator to heat the weak fluid and to condense the intermediate-temperature vapor.

12. A method of reducing thermal decomposition of a heat-transfer additive in an absorption-type refrigeration system using a fluid including a refrigerant, an absorbent, and a heat-transfer additive comprising the steps of:

heating a weak fluid including refrigerant, absorbent, and heat-transfer additive in a low-temperature generator to a temperature sufficient to vaporize the refrigerant but below the thermal decomposition temperature of the heat-transfer additive to form a low-temperature vapor including refrigerant and heat-transfer additive, and a low-temperature liquid including refrigerant and absorbent but substantially lacking heat-transfer additive;

heating a first portion of the low-temperature liquid in an intermediate-temperature generator to a temperature sufficient to vaporize the refrigerant but below the thermal decomposition temperature of the heat-transfer additive to form an intermediate-temperature vapor including refrigerant and an intermediate-temperature liquid including absorbent;

heating a second portion of the low-temperature liquid in a high-temperature generator to a temperature sufficient to vaporize the refrigerant to form a high-temperature vapor including refrigerant and a high-temperature liquid including absorbent;

condensing the low-temperature vapor to form a condensed liquid including refrigerant and heat-transfer additive liquid;

vaporizing the condensed liquid in an evaporator including an evaporator heat exchanger to cool a medium in the evaporator heat exchanger and to produce an evaporator vapor including refrigerant and heat-transfer additive;

exposing the evaporator vapor to a fluid including the intermediate-temperature and high-temperature liquids in an absorber so that refrigerant from the evaporator vapor is absorbed by the fluid and heat-transfer additive from the evaporator vapor condense on the surface of the fluid to form the weak fluid; and maintaining a pumping ratio within a range of 8 to 11.

13. A method of reducing thermal decomposition of a heat-transfer additive in an absorption-type refrigeration system using a fluid including a refrigerant, an absorbent, and a heat-transfer additive comprising the steps of:

heating a weak fluid including refrigerant, absorbent, and heat-transfer additive in a low-temperature generator to a temperature sufficient to vaporize the refrigerant but below the thermal decomposition temperature of the heat-transfer additive to form a low-temperature vapor including refrigerant and heat-transfer additive, and a low-temperature liquid including refrigerant and absorbent but substantially lacking heat-transfer additive;

heating a first portion of the low-temperature liquid in an intermediate-temperature generator to a temperature sufficient to vaporize the refrigerant but below the thermal decomposition temperature of the heat-transfer additive to form an intermediate-temperature vapor including refrigerant and an intermediate-temperature liquid including absorbent;

heating a second portion of the low-temperature liquid in a high-temperature generator to a temperature sufficient to vaporize the refrigerant to form a high-temperature vapor including refrigerant and a high-temperature liquid including absorbent;

condensing the low-temperature vapor to form a condensed liquid including refrigerant and heat-transfer additive liquid;

vaporizing the condensed liquid in an evaporator including an evaporator heat exchanger to cool a medium in the evaporator heat exchanger and to produce an evaporator vapor including refrigerant and heat-transfer additive;

exposing the evaporator vapor to a fluid including the intermediate-temperature and high-temperature liquids in an absorber so that refrigerant from the evaporator vapor is absorbed by the fluid and heat-transfer additive from the evaporator vapor condenses on the surface of the fluid to form the weak fluid;

placing the weak fluid in a heat exchange relationship with the high-temperature liquid and the intermediate-temperature liquid to heat the weak fluid, wherein the effectiveness of the heat exchange between the high-temperature and intermediate-temperature liquids and the weak fluid is within the range of 0.81 to 0.87.

14. The method of claim 12, further comprising the steps of:

placing an external source of heat in heat exchange relationship with the second portion of the low-temperature liquid in the high-temperature generator to heat the second portion of the low-temperature liquid;

placing the high-temperature vapor in heat exchange relationship with the first portion of the low-temperature liquid in the intermediate-temperature generator to heat the first portion of the low-temperature liquid and condense the high-temperature vapor; and placing the intermediate-temperature vapor combined with the condensed high-temperature vapor in heat exchange relationship with the weak fluid in the low-temperature generator to heat the weak fluid and condense the intermediate-temperature vapor.

15. The absorption-type refrigeration system of claim 1, further comprising an intermediate-temperature heat exchanger having an effectiveness within the range of 0.76 to 0.82 that places the low-temperature liquid in a heat exchange relationship with the high-temperature liquid to heat the low-temperature liquid before entering the intermediate-temperature generator.

16. The absorption-type refrigeration system of claim 15, further comprising a high-temperature heat exchanger having an effectiveness of at least approximately 0.87 that places the intermediate-temperature liquid in a heat exchange relationship with the high-temperature liquid to heat the intermediate-temperature liquid before entering the high-temperature generator.

17. The absorption-type refrigeration system of claim 6, wherein the intermediate-temperature heat exchanger has an effectiveness within the range of 0.78 to 0.86.

18. The absorption-type refrigeration system of claim 17, further comprising a high-temperature heat exchanger having an effectiveness of at least approximately 0.87 for placing the second portion of the low-temperature liquid in heat exchange relationship with the high-temperature liquid to heat the second portion of low-temperature liquid.

19. The method of claim 10, further comprising the step of placing the low-temperature liquid in a heat exchange relationship with the high-temperature liquid to heat the low-temperature liquid before entering the intermediate-temperature generator, wherein the effectiveness of the heat exchange between the high-temperature liquid and the low-temperature liquid is within the range of 0.78 to 0.86.

20. The method of claim 19, further comprising the step of placing the intermediate-temperature liquid in a heat exchange relationship with the high-temperature liquid to heat the intermediate-temperature liquid before entering the high-temperature generator, wherein the effectiveness of the heat exchange between the high-temperature liquid and the intermediate-temperature liquid is at least approximately 0.87.

21. The method of claim 13, further comprising the step of placing the low-temperature liquid in a heat-exchange relationship with the high-temperature liquid and the intermediate-temperature liquid to heat the low-temperature liquid, wherein the effectiveness of the heat exchange between the high-temperature and intermediate-temperature liquids and the low-temperature liquid is within the range of 0.78 to 0.86.

22. The method of claim 21, further comprising the step of placing the second portion of the low-temperature liquid in heat exchange relationship with the high-temperature liquid to heat the second portion of the low-temperature liquid, wherein the effectiveness of the heat exchange between the high-temperature liquid and the second portion of the low-temperature liquid is at least approximately 0.86.

23. An absorption-type refrigeration system, comprising:

an absorber in which a fluid including absorbent, refrigerant, and heat-transfer additive absorbs refrigerant vapor, and heat-transfer additive vapor condenses on the surface of the fluid;

a low-temperature generator for heating a liquid including absorbent, refrigerant, and heat-transfer additive to a temperature sufficient to vaporize the refrigerant but below the thermal decomposition temperature of the heat-transfer additive to form a low-temperature vapor including refrigerant and heat-transfer additive, and a low-temperature liquid including refrigerant and absorbent but substantially lacking heat-transfer additive;

a high-temperature generator for heating the low-temperature liquid to a temperature sufficient to vaporize the refrigerant and above the thermal decomposition temperature of the heat-transfer additive to form a high-temperature vapor including refrigerant and a high-temperature liquid including absorbent;

a condenser for condensing the low-temperature vapor to form a condensed liquid including refrigerant and heat-transfer additive; and an evaporator including an evaporator heat exchanger for vaporizing at least the condensed liquid to cool a medium in the evaporator heat exchanger and to form a vapor including refrigerant and heat-transfer additive that is supplied to the absorber;

wherein the pumping ratio of the system is within a range of 8 to 11.

24. The absorption-type refrigeration system of claim 2, further comprising a conduit for accepting weak fluid from the absorber and supplying a first portion of the weak fluid to the low-temperature generator and returning a second portion of the weak fluid to the absorber.

25. The absorption-type refrigeration system of claim 23, further comprising a conduit for accepting a weak fluid formed by the absorber and supplying a first portion of the weak fluid to the low-temperature generator and returning a second portion of the weak fluid to the absorber.

* * * * *

UNITED STATES PATENT AND TRADEMARK OFFICE
CERTIFICATE OF CORRECTION

PATENT NO. : 5,584,193
DATED      : December 17, 1996
INVENTOR(S): Wendell J. BIERMANN It is certified that error appears in the above-indentified patent and that said Letters Patent is hereby corrected as shown below:

Claim 10, col. 21, line 44, after "fluid;" insert --and--.

Claim 13, col. 23, line 11, after "fluid;" insert --and--.

Signed and Sealed this

Twenty-fifth Day of February, 1997

Attest:

BRUCE LEHMAN

Attesting Officer     Commissioner of Patents and Trademarks